(12) United States Patent
Kim

(10) Patent No.: US 11,397,440 B2
(45) Date of Patent: Jul. 26, 2022

(54) VEHICLE CONTROL SYSTEM, EXTERNAL ELECTRONIC CONTROL UNIT, VEHICLE CONTROL METHOD, AND APPLICATION

(71) Applicant: MANDO CORPORATION, Pyeongtaek-si (KR)

(72) Inventor: Soon Tae Kim, Yongin-si (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 0 days.

(21) Appl. No.: 16/142,650

(22) Filed: Sep. 26, 2018

(65) Prior Publication Data

US 2019/0094882 A1   Mar. 28, 2019

(30) Foreign Application Priority Data

Sep. 26, 2017   (KR) .......................... 10-2017-0123971

(51) Int. Cl.
*B60W 10/06* (2006.01)
*B60W 10/18* (2012.01)
(Continued)

(52) U.S. Cl.
CPC ....... *G05D 1/0276* (2013.01); *B60R 16/0231* (2013.01); *B60W 10/06* (2013.01);
(Continued)

(58) Field of Classification Search
CPC .. G05D 1/0276; G05D 1/0231; G05D 1/0214; G05D 1/0257; G05D 1/0255;
(Continued)

(56) References Cited

U.S. PATENT DOCUMENTS 6,151,539 A * 11/2000 Bergholz ............ B60W 30/186
701/25
10,395,332 B1 * 8/2019 Konrardy .......... G06F 16/90335
(Continued)

FOREIGN PATENT DOCUMENTS

EP   2747056 A1   6/2014
FR   3032674 A1   8/2019
(Continued)

OTHER PUBLICATIONS

European Search Report issued in European Patent Application No. 18196949.4 dated Sep. 25, 2019.

*Primary Examiner* — Alan D Hutchinson
(74) *Attorney, Agent, or Firm* — Morgan, Lewis & Bockius LLP

(57) ABSTRACT

Exemplary embodiments relate to a vehicle control system, an external electronic control unit, a vehicle control method, and an application, and more particularly, to a vehicle communication system installed in a vehicle and an external electronic control unit capable of performing vehicle control by transmitting, to the vehicle communication system, a vehicle control signal for controlling behavior of the vehicle on the basis of vehicle information received from the vehicle communication system. According to exemplary embodiments, it is possible to easily add or update a vehicle control function, to perform precise vehicle control, and also to perform autonomous traveling control with a user's terminal.

20 Claims, 19 Drawing Sheets

(51) Int. Cl.
| | |
|---|---|
| *B60W 10/20* | (2006.01) |
| *B60W 10/22* | (2006.01) |
| *B60W 50/00* | (2006.01) |
| *G01C 21/36* | (2006.01) |
| *G05D 1/02* | (2020.01) |
| *H04W 4/80* | (2018.01) |
| *B60R 16/023* | (2006.01) |
| *B60W 10/188* | (2012.01) |
| *B60W 30/095* | (2012.01) |
| *B60W 50/04* | (2006.01) |
| *H04W 4/46* | (2018.01) |
| *H04L 67/12* | (2022.01) |

(52) U.S. Cl.
CPC .......... *B60W 10/18* (2013.01); *B60W 10/188* (2013.01); *B60W 10/20* (2013.01); *B60W 10/22* (2013.01); *B60W 30/0953* (2013.01); *B60W 30/0956* (2013.01); *B60W 50/00* (2013.01); *B60W 50/045* (2013.01); *G01C 21/3691* (2013.01); *G05D 1/0214* (2013.01); *G05D 1/0231* (2013.01); *G05D 1/0255* (2013.01); *G05D 1/0257* (2013.01); *H04W 4/46* (2018.02); *B60K 2370/573* (2019.05); *B60W 2050/0006* (2013.01); *B60W 2050/046* (2013.01); *B60W 2420/42* (2013.01); *B60W 2510/20* (2013.01); *B60W 2520/06* (2013.01); *B60W 2520/10* (2013.01); *B60W 2520/105* (2013.01); *B60W 2520/14* (2013.01); *B60W 2540/18* (2013.01); *B60W 2552/15* (2020.02); *B60W 2554/00* (2020.02); *B60W 2556/45* (2020.02); *B60W 2556/50* (2020.02); *B60W 2556/55* (2020.02); *B60W 2556/65* (2020.02); *B60W 2710/06* (2013.01); *B60W 2710/18* (2013.01); *B60W 2710/20* (2013.01); *B60W 2710/22* (2013.01); *B60W 2756/10* (2020.02); *G05D 2201/0213* (2013.01); *H04L 67/12* (2013.01); *H04W 4/80* (2018.02)

(58) Field of Classification Search
CPC ...... G05D 2201/0213; B60W 30/0953; B60W 50/045; B60W 30/0956; B60W 10/188; B60W 10/18; B60W 10/22; B60W 10/06; B60W 50/00; B60W 2420/42; B60W 2550/14; B60W 2540/18; B60W 2550/20; B60W 2550/40; B60W 2050/0006; B60W 2550/408; B60W 2550/404; B60W 2520/10; B60W 2520/105; B60W 2520/14; B60W 2510/20; B60W 2550/10; B60W 2710/06; B60W 2710/18; B60W 2710/20; B60W 2710/22; B60W 2550/402; B60W 2520/06; B60W 2750/40; B60W 30/09; B60W 2550/406; B60W 10/20; B60W 2552/15; B60W 2554/00; B60W 2556/45; B60W 2556/50; B60W 2556/55; B60W 2556/65; B60W 2756/10; B60W 2556/60; B60W 2050/046; H04W 4/46; H04W 4/80; B60R 16/0231; H04L 67/12; B60K 2370/573; G01C 21/3691

See application file for complete search history.

(56) References Cited

U.S. PATENT DOCUMENTS

| | | | |
|---|---|---|---|
| 10,403,133 B1* | 9/2019 | Christensen | G08G 1/0145 |
| 2008/0077311 A1* | 3/2008 | Gauthier | B60T 7/22 |
| | | | 701/117 |
| 2014/0172197 A1 | 6/2014 | Ganz et al. | |
| 2014/0219510 A1* | 8/2014 | Nagaoka | B60W 30/09 |
| | | | 382/104 |
| 2014/0316668 A1* | 10/2014 | Akiyama | B60W 10/184 |
| | | | 701/70 |
| 2016/0146616 A1* | 5/2016 | Ren | G01C 21/30 |
| | | | 701/409 |
| 2017/0308075 A1* | 10/2017 | Whitaker | B60W 10/04 |
| 2018/0106654 A1* | 4/2018 | Kim | B60W 30/00 |
| 2018/0136660 A1* | 5/2018 | Mudalige | G05D 1/021 |
| 2019/0047468 A1* | 2/2019 | Morimura | G06K 9/00805 |
| 2019/0077402 A1* | 3/2019 | Kim | G08G 1/096791 |

FOREIGN PATENT DOCUMENTS

| | | | |
|---|---|---|---|
| JP | 2011150512 | * | 8/2011 |
| KR | 101716047 B1 | * | 3/2017 |

* cited by examiner

VEHICLE CONTROL SYSTEM, EXTERNAL ELECTRONIC CONTROL UNIT, VEHICLE CONTROL METHOD, AND APPLICATION

CROSS REFERENCE TO RELATED APPLICATION

This application claims priority from Korean Patent Application No. 10-2017-0123971, filed on Sep. 26, 2017, which is hereby incorporated by reference for all purposes as if fully set forth herein.

BACKGROUND OF THE INVENTION

1. Field of the Invention

Exemplary embodiments relate to a vehicle control system, an external electronic control unit, a vehicle control method, and an application.

2. Description of the Prior Art

These days, technologies are being developed to provide various control functions as vehicles become more intelligent.

Conventional vehicle control techniques enable an electronic control device in a vehicle to autonomously determine a control state or a control amount to perform control of the vehicle by means of sensors in the vehicle.

However, the conventional vehicle control techniques provide vehicle control by using an electronic control device already mounted in a vehicle during a vehicle manufacturing process. Thus, when a new vehicle control function is required, the vehicle should be put on a factory so that a new electronic control device may be additionally mounted or substituted for the electronic control device mounted in the vehicle.

Also, the conventional vehicle control techniques cannot provide precise vehicle control because a vehicle cannot be controlled in comprehensive consideration of road conditions and traffic conditions around the vehicle.

SUMMARY OF THE INVENTION

Exemplary embodiments are directed to providing a vehicle control system, an external electronic control unit, a vehicle control method, and an application which facilitate application of an additional vehicle control function or a vehicle control function update.

Also, exemplary embodiments are directed to providing a vehicle control system, an external electronic control unit, a vehicle control method, and an application which are capable of precise vehicle control.

Also, exemplary embodiments are directed to providing a vehicle control system, an external electronic control unit, a vehicle control method, and an application which are capable of autonomous vehicular traveling with a user's terminal.

Embodiments may provide a vehicle control system including an image sensor operable to be disposed at the vehicle so as to have a field of view exterior of the vehicle, and configured to capture image data, a first processor configured to process the image data captured by the image sensor, at least one sensor capable of being disposed in the vehicle and configured to detect vehicle behavior information of the vehicle, a second processor configured to process the vehicle behavior information detected by the at least one sensor, one or more actuators capable of being disposed in the vehicle to execute behavior of the vehicle, and a vehicle communication system disposed in the vehicle and configured to communicate with the first processor and the second processor.

The vehicle communication system may transmit vehicle information acquired from the first processor and the second processor to an external electronic control unit present inside or outside the vehicle, receive a vehicle control signal for controlling the behavior of the vehicle from the external electronic control unit, and output the received vehicle control signal such that the one or more actuators are executed by the received vehicle control signal.

Embodiments may provide a vehicle control system including an image sensor operable to be disposed at the vehicle so as to have a field of view exterior of the vehicle, and configured to capture image data, at least one sensor capable of being disposed in the vehicle and configured to detect vehicle behavior information of the vehicle, and a domain control configured to process the image data captured by the image sensor, process the vehicle behavior information detected by the at least one sensor, and control at least one of a steering device, a braking device, a suspension device, and an engine device of the vehicle, wherein the domain control processes information detected by the image sensor and the at least one sensor to acquire vehicle information, transmits the acquired vehicle information to an external electronic control unit present inside or outside the vehicle, receives a vehicle control signal for controlling behavior of the vehicle from the external electronic control unit, and outputs the received vehicle control signal to operate at least one of the steering device, the braking device, the suspension device, and the engine device of the vehicle according to the received vehicle control signal.

Embodiments may provide an image sensor capable of being disposed in a vehicle to have visibility to an outside of the vehicle and configured to capture image data, wherein the image data is processed by an image processor, is transmitted to an external electronic control unit present inside or outside the vehicle, and is used by the external electronic control unit to generate a vehicle control signal for controlling behavior of the vehicle, and the vehicle control signal is received from the external electronic control unit and is output to one or more actuators capable of being disposed in the vehicle to execute the behavior of the vehicle.

Embodiments may provide an external electronic control unit including a communication module configured to communicate with a vehicle communication system provided in a vehicle and a vehicle controller configured to transmit a vehicle control signal for controlling behavior of the vehicle to the vehicle communication system through the communication module on the basis of vehicle information received from the communication module. In the external electronic control unit, the communication module and the vehicle controller may be present inside or outside the vehicle.

Embodiments provide a method of operating a vehicle control system through an external electronic control unit present inside or outside a vehicle, the method including starting communication with a vehicle communication system disposed in the vehicle, generating a vehicle control signal for controlling behavior of the vehicle on the basis of vehicle information received from the vehicle communication system, and performing control to transmit the vehicle control signal to the vehicle communication system.

An application stored in a recording medium for executing a method performed by an external electronic control unit present inside or outside a vehicle, the method comprising: performing control to start communication with a vehicle communication system disposed in the vehicle; starting communication with the vehicle communication system; generating a vehicle control signal for controlling behavior of the vehicle on the basis of vehicle information received from the vehicle communication system; and performing control to transmit the vehicle control signal to the vehicle communication system.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1A:
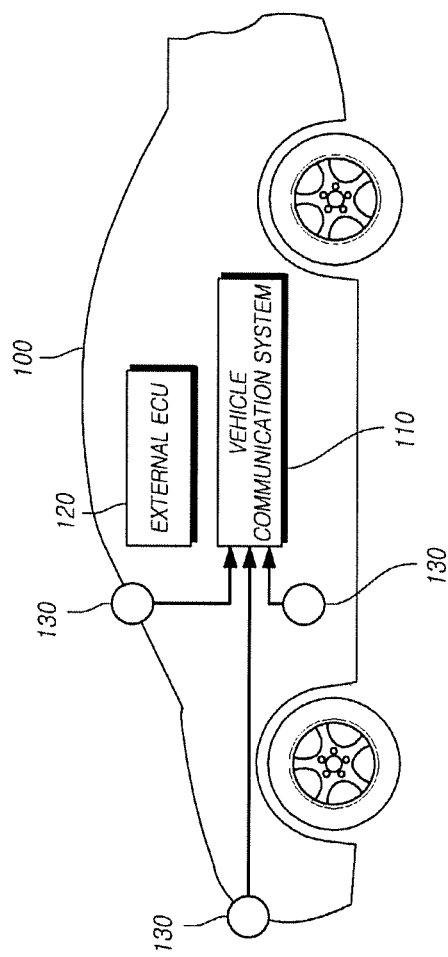
FIG. 1A is a schematic diagram of a vehicle according to exemplary embodiments.

Hereinafter, some embodiments of the present invention will be described in detail with reference to the accompanying drawings. In adding reference numerals to elements in each figure, it should be noted that the same elements will be designated by the same reference numerals, if possible, although they are shown in different drawings. Moreover, detailed description related to well-known functions or configurations will be ruled out in order not to unnecessarily obscure subject matters of the present disclosure.

In addition, terms such as first, second, A, B, (a), (b) or the like may be used herein when describing elements of some embodiments of the present invention. These terms are merely used to distinguish one structural element from other structural elements, and a property, an order, a sequence, a number and the like of a corresponding structural element are not limited by the term. It should be noted that if it is described in the specification that one component is "connected," "coupled" or "joined" to another component, the former may be directly "connected," "coupled" or "joined" to the latter or "connected," "coupled" or "joined" to the latter via another component.

Figure 1B:
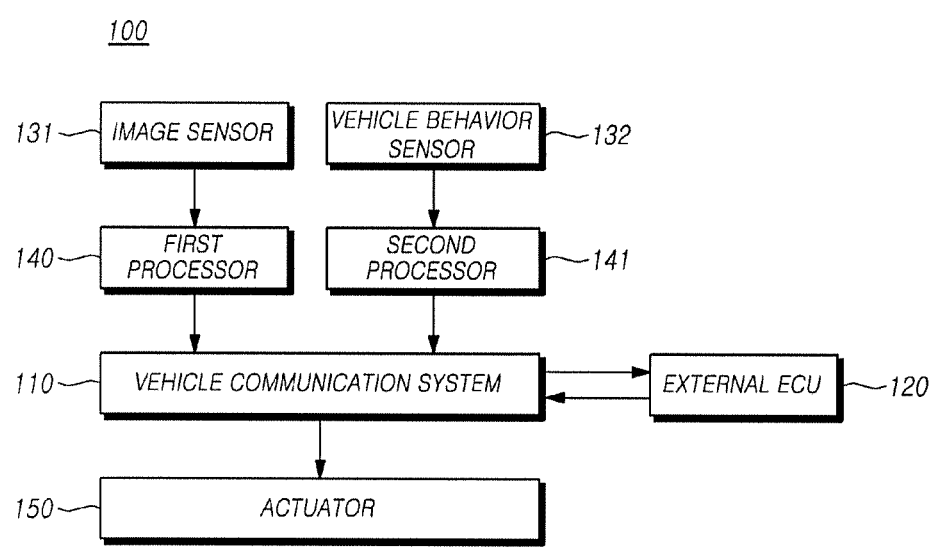
FIG. 1B is a block diagram of a vehicle control system according to exemplary embodiments.
Figure 1C:
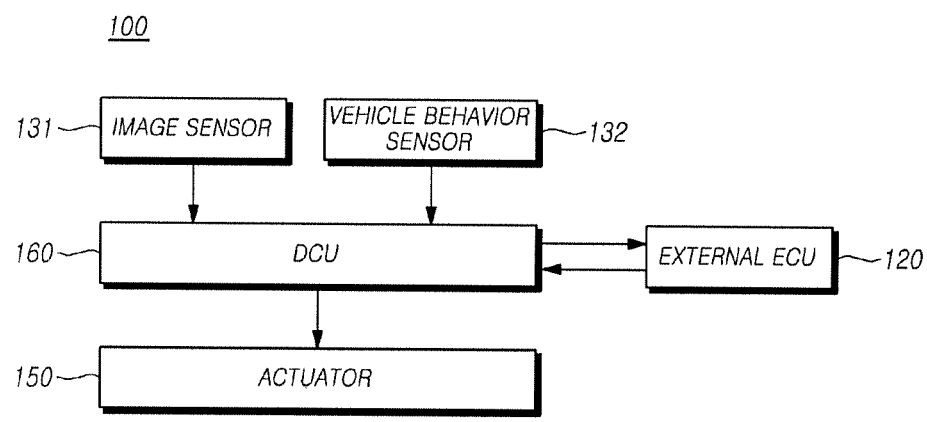
FIG. 1C is a block diagram of a vehicle control system including a domain control according to exemplary embodiments.

FIG. 1A is a schematic diagram of a vehicle 100 according to exemplary embodiments. FIG. 1B is a block diagram of a vehicle control system according to exemplary embodiments. FIG. 1C is a block diagram of a vehicle control system including a domain control according to exemplary embodiments.

Referring to FIG. 1A, the vehicle 100 according to exemplary embodiments may include one or more sensor devices 130, a vehicle communication system 110 that communicates with the sensor devices 130, etc.

The vehicle communication system 110, which is a communication system provided in the vehicle 100, may communicate with the one or more sensor devices 130 mounted in the vehicle 100.

Also, the vehicle communication system 110 may communicate with an external electronic control unit 120 (hereinafter also referred to as an external ECU or terminal) that is not mounted in the vehicle 100 but is present in a communication range.

In exemplary embodiments, the external ECU 120 capable of communicating with the vehicle communication system 110 may be a control device capable of controlling the vehicle 100 in coordination with the vehicle communication system 110.

The vehicle communication system 110 may transmit vehicle information to the external ECU 120, receive a vehicle control signal from the external ECU 120, and deliver the vehicle control signal to an actuator that performs vehicle behavior in the vehicle 100.

In exemplary embodiments, the external ECU 120, which may be a vehicle control device, may be mounted inside the vehicle 100 or may be carried by a driver.

As an example, the external ECU 120 may be a mobile terminal such as a smartphone and a tablet, a wearable device such as a smart watch and smart glasses, or the like. Alternatively, the external ECU 120 may be a hardware module or a software module in such a terminal.

The external ECU 120 according to exemplary embodiments may be mounted inside the vehicle 100 or carried by the driver and may transmit a vehicle control signal for controlling the behavior of the vehicle 100 to the vehicle communication system 110 on the basis of vehicle information received the vehicle from communication system 110.

As described above, the external ECU 120 according to exemplary embodiments receives the vehicle information from the vehicle communication system 110. Here, the vehicle information may include one or more types of information, for example, vehicle behavior information for the vehicle 100, nearby-object detection information for an object near the vehicle 100, and the like.

The aforementioned vehicle behavior information may include one or more of vehicle speed information, acceleration information (longitudinal acceleration information, lateral acceleration information, etc.), yaw rate information, steering angle information, direction angle change information (attitude angle variation information), gradient information (inclination information), and torque information for the vehicle 100.

Also, the nearby-object detection information may include one or more of radar-detected information, camera-detected information, laser-detected information, and ultrasonic detection information.

Referring to FIG. 1B, a vehicle control system of the vehicle 100 according to an embodiment of the present disclosure may include an image sensor 131 capable of being disposed in the vehicle 100 to have visibility to the outside of the vehicle 100 and configured to capture image data, a first processor 140 configured to process the image data captured by the image sensor 131, at least one sensor 132 disposed in the vehicle 100 and configured to detect vehicle behavior information of the vehicle 100, a second processor 141 configured to process the vehicle behavior information detected by the at least one sensor 132, one or more actuators 150 disposed in the vehicle 100 to perform vehicle behavior, and a vehicle communication system 110 disposed in the vehicle 100 and configured to communicate with the first processor 140 and the second processor 141.

The vehicle communication system 110, which is a communication system provided in the vehicle 100, may communicate with at least one image sensor 131 and one or more sensors 132 mounted in the vehicle 100.

As an example, the image sensor 131 may be disposed in the vehicle 100 to have visibility to the outside of the vehicle 100. The image sensor 131 may include a plurality of image sensors disposed at corresponding parts of the vehicle 100 to have visibility to the front, the rear, or the sides of the vehicle 100. The image data captured by the image sensor 131 may be processed by the first processor 140. The image data processed by the first processor 140 may include nearby-object detection information for an object located near the vehicle 100. The vehicle communication system 110 may provide the nearby-object detection information received from the first processor 140 to the external ECU 120.

Also, as an example, the vehicle 100 may further include a non-image sensor such as a laser sensor or an ultrasonic sensor. The non-image sensor is disposed in the vehicle 100 and configured to capture sensing data in order to detect one object near the vehicle 100. In detail, the non-image sensor refers to a sensor for calculating information regarding a location of and a distance to a target object by transmitting electromagnetic waves such as radar waves or ultrasonic waves, receiving signals reflected from the target object, and analyzing the received signals.

Also, the vehicle control system may include at least one vehicle behavior sensor 132 for acquiring information associated with the behavior of the vehicle 100. The at least one vehicle behavior sensor 132 may be disposed at corresponding positions of the vehicle 100 in order to detect the vehicle behavior information. For example, the vehicle behavior sensor 132 may include at least one of a vehicle speed sensor for detecting and outputting vehicle speed information, an acceleration sensor for detecting and outputting acceleration information, a yaw rate sensor for detecting and outputting yaw rate information, a steering angle sensor for detecting and outputting steering angle information, a direction angle change sensor for detecting and outputting direction angle information, a gradient sensor for detecting and outputting road surface gradient information, and a torque sensor for detecting and outputting a steering torque.

Also, the vehicle communication system 110 may communicate with the external ECU 120 that is not mounted in the vehicle 100 but is present in a communication range and also the actuator 150 that performs vehicle behavior. Descriptions of the vehicle communication system 110, the external ECU 120, and the actuator 150 are substantially the same as described in FIG. 1A, and thus detailed descriptions thereof will be omitted to avoid repetition of description.

Referring to FIG. 1C, a vehicle control system of the vehicle 100 according to another embodiment of the present disclosure may include an image sensor 131 disposed in the vehicle 100 to have visibility to the outside of the vehicle 100 and configured to capture image data, at least one vehicle behavior sensor 132 disposed in the vehicle 100 and configured to detect vehicle behavior information for the vehicle 100, and a domain control 160 (e.g., a domain control unit (DCU)) configured to process the image data captured by the image sensor 131, process the vehicle behavior information detected by the at least one vehicle behavior sensor 132, and control at least one of a steering device, a brake device, a suspension device, and an engine device of the vehicle 100.

The domain control 160 may process the information detected by the image sensor 131 and the at least one sensor 132 to acquire vehicle information. The domain control 160 may transmit the acquired vehicle information to the external ECU 120 present inside or outside the vehicle 100. The domain control 160 may receive a vehicle control signal for controlling vehicle behavior from the external ECU 120. The domain control 160 may output the received vehicle control signal to operate at least one of the steering device, the brake device, the suspension device, and the engine device of the vehicle 100 according to the received vehicle control signal. That is, the domain control 160 may have a function of receiving and processing information obtained from several vehicular sensors or a function of relaying transmission and reception of the processed information and control signals.

The domain control 160 may be provided in the vehicle 100 to communicate with at least one image sensor 131 and one or more sensors 132 mounted in the vehicle 100. To this end, an appropriate data link or communication link such as a vehicle network bus for data transmission or signal communication may be further included.

As an example, the image sensor 131 may be disposed in the vehicle 100 to have visibility to the outside of the vehicle 100. The image sensor 131 may include a plurality of image sensors disposed at corresponding parts of the vehicle 100 to have visibility to the front, the rear, or the sides of the vehicle 100. The image data captured by the image sensor 131 may be processed by the domain control 160. The image data processed by the domain control 160 may include nearby-object detection information for an object located near the vehicle 100. The domain control 160 may provide the acquired nearby-object detection information to the external ECU 120.

Also, the vehicle control system may include at least one vehicle behavior sensor 132 for acquiring information associated with the behavior of the vehicle 100. The at least one vehicle behavior sensor 132 may be disposed at corresponding positions of the vehicle 100 in order to detect the vehicle behavior information. For example, the vehicle behavior sensor 132 may include at least one of a vehicle speed sensor for detecting and outputting vehicle speed information, an acceleration sensor for detecting and outputting acceleration information, a yaw rate sensor for detecting and outputting yaw rate information, a steering angle sensor for detecting and outputting steering angle information, a direction angle change sensor for detecting and outputting direction angle information, a gradient sensor for detecting and outputting road surface gradient information, and a torque sensor for detecting and outputting a steering torque.

Also, the domain control 160 may communicate with the external ECU 120 that is not mounted in the vehicle 100 but is present in a communication range and also the actuator 150 that performs vehicle behavior. In exemplary embodiments, the external ECU 120 capable of communicating with the domain control 160 may be a control device capable of controlling the vehicle 100 in coordination with the domain control 160.

The domain control 160 may transmit vehicle information to the external ECU 120, receive a vehicle control signal from the external ECU 120, and deliver the vehicle control signal to the actuator 150 that performs vehicle behavior in the vehicle 100.

In exemplary embodiments, the external ECU 120, which may be a vehicle control device, may be mounted inside the vehicle 100 or may be carried by a driver.

As an example, the external ECU 120 may be a mobile terminal such as a smartphone and a tablet, a wearable device such as a smart watch and smart glasses, or the like. Alternatively, the external ECU 120 may be a hardware module or a software module in such a terminal.

The external ECU 120 according to exemplary embodiments may be mounted inside the vehicle 100 or carried by the driver and may transmit a vehicle control signal for controlling the behavior of the vehicle 100 to the domain control 160 on the basis of vehicle information received from the domain control 160.

As described above, the external ECU 120 according to exemplary embodiments receives the vehicle information from the domain control 160. Here, the vehicle information may include one or more types of information, for example, vehicle behavior information for the vehicle 100, nearby-object detection information for an object near the vehicle 100, and the like.

The aforementioned vehicle behavior information may include one or more of vehicle speed information, acceleration information (longitudinal acceleration information, lateral acceleration information, etc.), yaw rate information, steering angle information, direction angle change information (attitude angle variation information), gradient information (inclination information), and torque information for the vehicle 100.

Also, the nearby-object detection information may include one or more of radar-detected information, camera-detected information, laser-detected information, and ultrasonic detection information.

The vehicle 100 according to another embodiment of the present disclosure may include a vehicle image sensor represented as a camera, an image system, or a vision system. Such a vehicle image sensor may include a front camera having visibility to the front of the vehicle, a rear camera having visibility to the rear of the vehicle, a rear and side camera having visibility to a side or a rear and side of the vehicle, and the like. In some cases, the vehicle image sensor may selectively include one or more of the cameras.

Such a camera is configured to capture image data regarding surroundings of the vehicle 100 and deliver the image data to a processor or controller. The vision system or the image sensor according to this embodiment may additionally include an ECU or an image processor configured to process and display the captured image data on a display or the like.

Also, the vision system or image sensor according to this embodiment may further include an appropriate data link or communication link such as a vehicle network bus for data transmission or signal communication from a camera to an image processor.

The image data detected by the image sensor may be processed by the image processor and transmitted to an external electronic control unit present inside or outside the vehicle 100 and may be used by the external electronic control unit to generate a vehicle control signal for controlling the behavior of the vehicle 100. The vehicle control signal may be received from the external electronic control unit and output to one or more actuators that may be disposed in the vehicle to perform vehicle behavior.

The above-described vehicle information may be acquired by several sensor devices 130 mounted in the vehicle 100. This will be described in detail below with reference to FIGS. 2 and 3.

Figure 2:
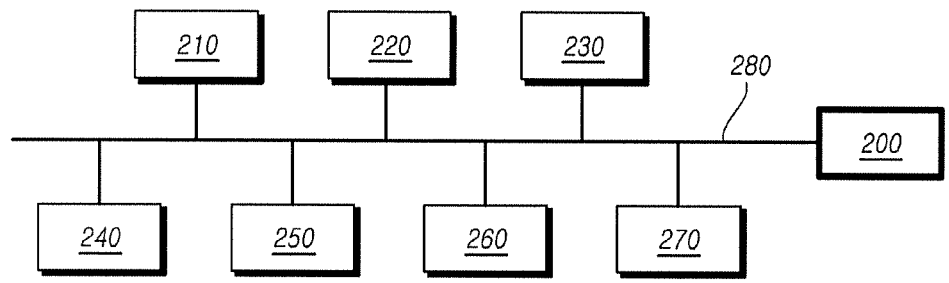
FIGS. 2 and 3 are diagrams showing a vehicle communication system and a sensor device according to exemplary embodiments.
Figure 3:
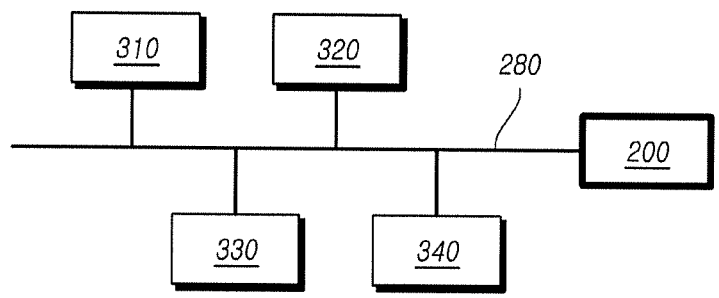

FIGS. 2 and 3 are diagrams showing the vehicle communication system 110 and the sensor device 130 according to exemplary embodiments.

Referring to FIG. 2, in order to provide vehicle behavior information to the external ECU 120, the vehicle communication system 110 may communicate with one or more sensor devices 130 among a vehicle speed sensor 210 for detecting and outputting vehicle speed information, an acceleration sensor 220 for detecting and outputting acceleration information, a yaw rate sensor 230 for detecting and outputting yaw rate information, a steering angle sensor 240 for detecting and outputting steering angle information, a direction angle change sensor 250 for detecting and outputting direction angle (attitude angle) information, a gradient sensor 260 for detecting and outputting road surface gradient information, and a torque sensor 270 for detecting and outputting a steering torque.

Referring to FIG. 3, in order to provide nearby-object detection information to the external ECU 120, the vehicle communication system 110 may communicate with one or more sensor devices 130 among a radar device 310 for outputting radar-detected information, a camera device 320 for outputting camera-detected information, a laser device 330 for outputting laser-detected information, and an ultrasonic sensor 340 for outputting ultrasonic detection information.

Referring to FIGS. 2 and 3, the vehicle communication system 110 may include a communication interface 280 for communicating with a nearby sensor device 130, a communication device 200 for communicating with the external ECU 120, etc.

The communication interface 280 included in the vehicle communication system 110 may be a communication interface based on at least one of Controller Area Network (CAN), Local Interconnect Network (LIN), FlexRay, Ethernet, and the like.

The communication interface 280 included in the vehicle communication system 110 may include a wireless communication interface in addition to the wired communication interfaces that were described as an example or may include only the wireless communication interface.

The communication device 200 included in the vehicle communication system 110 may communicate with the external ECU 120 in at least one communication scheme, for example, Bluetooth, Ultra-Wideband (UWB), Zigbee, WiFi, and the like.

The communication scheme between the vehicle communication system 110 and the external ECU 120 may be a wired communication scheme or a connector-based communication scheme as well as the wireless communication schemes that were described as an example.

Through such a communication scheme between the vehicle communication system 110 and the external ECU 120, the vehicle communication system 110 and the external ECU 120 may transmit and receive information to and from each other.

The external ECU 120 may control the behavior of the vehicle 100 by generating a vehicle control signal for controlling the behavior of the vehicle 100 using vehicle information obtained from the vehicle communication system 110 and then transmitting the generated vehicle control signal to the vehicle communication system 110.

The vehicle control by the external ECU 120 will be described below in detail with reference to several drawings.

Figure 4:
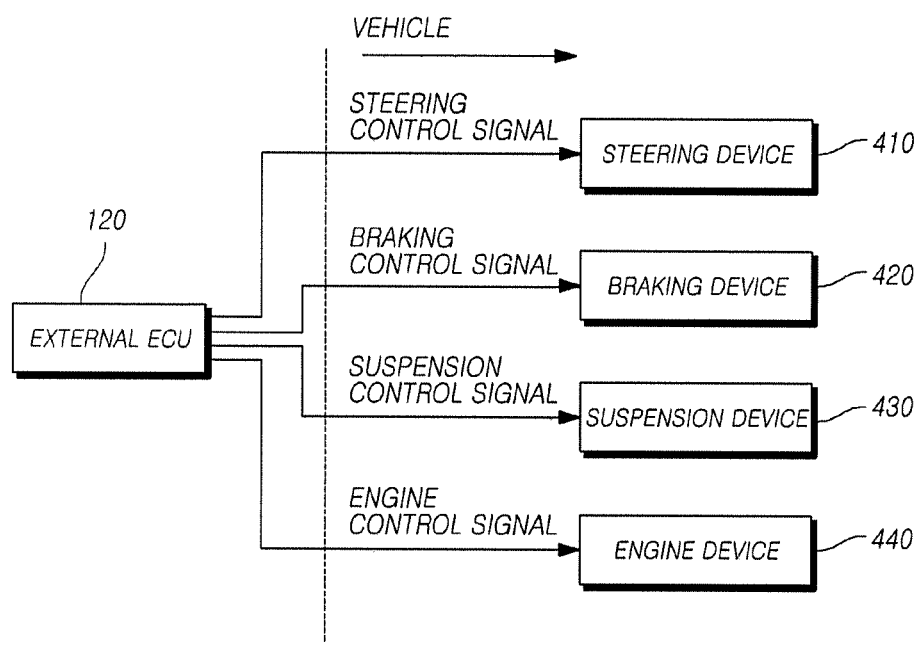
FIG. 4 is a diagram schematically showing vehicle control performed by an external electronic control unit according to exemplary embodiments.

FIG. 4 is a diagram schematically showing vehicle control performed by the external ECU 120 according to exemplary embodiments.

Referring to FIG. 4, the external ECU 120 according to exemplary embodiments may perform the vehicle control by generating a vehicle control signal using vehicle information or the like received from the vehicle communication system 110 and then transmitting the generated vehicle control signal to the vehicle communication system 110.

In this case, the actuator in the vehicle 100 which is to be controlled may include at least one of, as an example, a steering device 410, a braking device 420, a suspension device 430, and an engine device 440.

The steering device 410 may be a mechanical device for performing steering control or an ECU for controlling the mechanical device.

The braking device 420 may be a mechanical device for performing braking control or an ECU for controlling the mechanical device.

The suspension device 430 may be a mechanical device for performing suspension control or an ECU for controlling the mechanical device.

The engine device 440 may be an engine itself or an ECU for controlling the engine.

As described above, the external ECU 120 according to exemplary embodiments may perform one or more of the steering control, the braking control, the suspension control, and the engine control of the vehicle 100 by generating a vehicle control signal including one or more of a steering control signal, a braking control signal, a suspension control signal, and an engine control signal for the vehicle 100 using vehicle information (e.g., vehicle behavior information, nearby-object detection information, and the like) received from the vehicle communication system 110 and then transmitting the vehicle control signal to the vehicle communication system 110.

The location and the internal system of the external ECU 120 according to the above-described exemplary embodiments will be described below in detail with reference to FIGS. 5 to 7.

Figure 5:
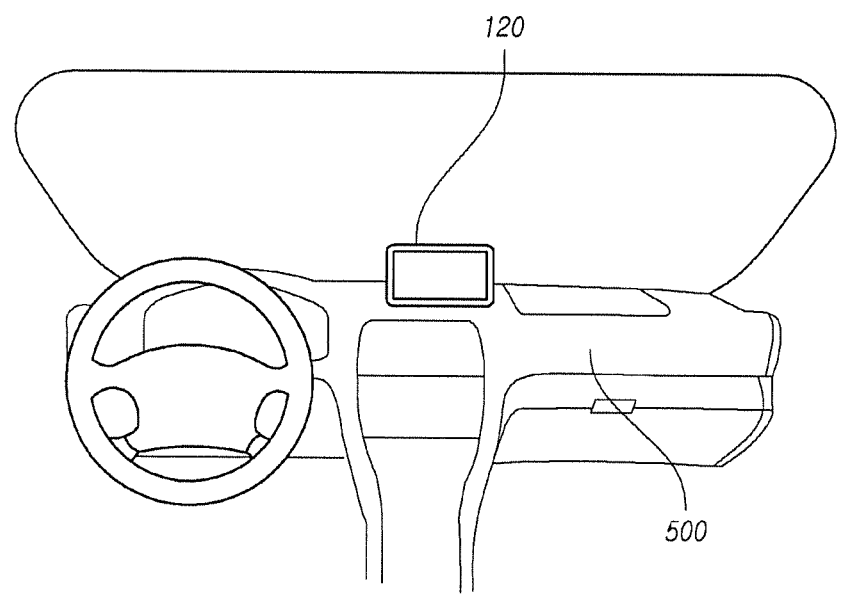
FIG. 5 is a diagram showing that an external electronic control unit is mounted in a vehicle according to exemplary embodiments.

FIG. 5 is a diagram showing that the external ECU 120 is mounted in the vehicle 100 according to exemplary embodiments.

Referring to FIG. 5, the external ECU 120 according to exemplary embodiments may be installed in a dashboard 500 of the vehicle 100. The external ECU 120 may correct or generate a vehicle control signal using external electronic control unit behavior information regarding movement of the external ECU 120 corresponding to the vehicle behavior. Thus, the external ECU 120 may be fixed in the vehicle 100 in order to reduce errors that may occur due to independent movement of the external ECU 120. However, as an example, the external ECU 120 may further have a separate function of correcting the errors due to the independent movement of the external ECU 120. The external ECU 120 may be located at a predetermined position in the vehicle 100.

According to exemplary embodiments, the location (e.g., GPS coordinates, a communication service location such as a base station location, etc.) of the external ECU 120 may be processed as information corresponding to the location of the vehicle 100.

Figure 6:
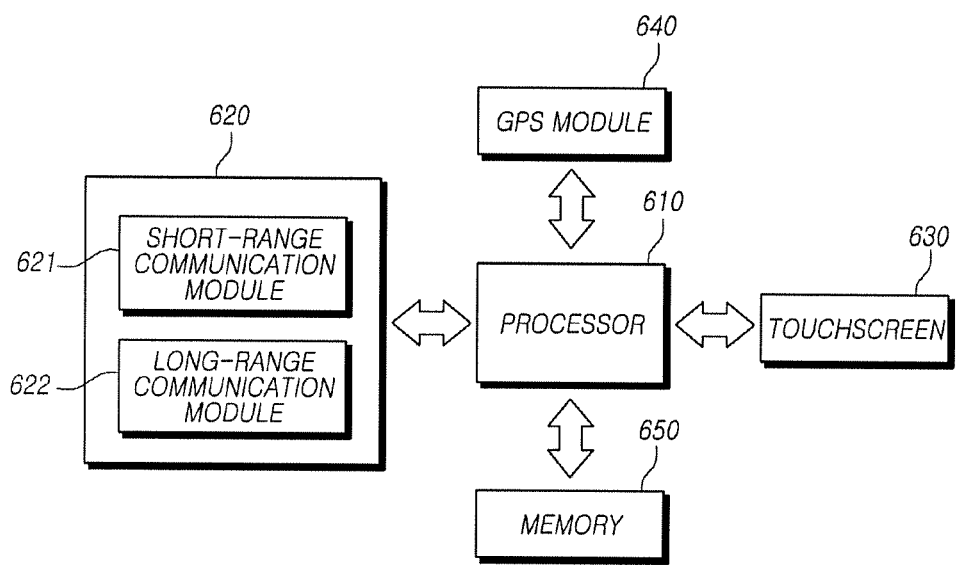
FIG. 6 is a system configuration diagram of an external electronic control unit according to exemplary embodiments.

FIG. 6 is a system configuration diagram of the external ECU 120 according to exemplary embodiments.

Referring to FIG. 6, the external ECU 120 according to exemplary embodiments may include a processor 610, a communication module 620, a touchscreen 630, a GPS module 640, a memory 650, and the like.

The processor 610 may receive various kinds of information from the communication module 620, the touchscreen 630, the GPS module 640, the memory 650, and the like, which are peripheral devices, and perform corresponding functions using the received information.

The communication module 620 may include a communication module 621 based on at least one communication scheme, for example, Bluetooth, Ultra-Wideband (UWB), Zigbee, WiFi, and the like.

Also, the communication module 620 may further include a long-distance communication module 622, for example, a Long-Tam Evolution (LTE) communication module, a Wireless Broadband (WIBRO) communication module, or the like.

For example, the memory 650 may store various kinds of data needed for vehicle control of the external ECU 120 and may store vehicle information received from the vehicle communication system 110 or vehicle control information to be transmitted to the vehicle communication system 110.

The touchscreen 630 may provide a screen interface associated with the vehicle control and may receive user operation information or output a vehicle control result of the external ECU 120, through the screen interface.

Also, the touchscreen 630 may provide a screen associated with a navigation function.

Figure 7:
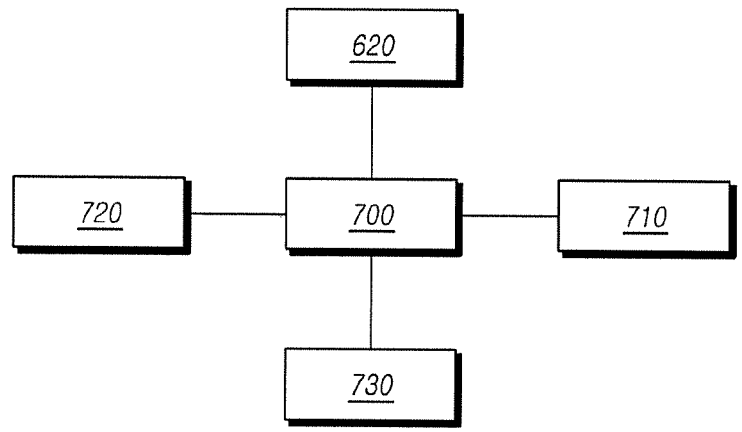
FIG. 7 is a diagram showing vehicle control components included in an external electronic control unit according to exemplary embodiments.

FIG. 7 is a diagram showing vehicle control components included in the external ECU 120 according to exemplary embodiments.

Referring to FIG. 7, the external ECU 120 according to exemplary embodiments may include, as the vehicle control components, a communication module 620 and a vehicle controller 700.

The communication module 620 may communicate with the vehicle communication system 110 provided in the vehicle 100.

The vehicle controller 700 may transmit a vehicle control signal for controlling the behavior of the vehicle 100 to the vehicle communication system 110 through the communication module 620 on the basis of the vehicle information received from the communication module 620.

Also, the external ECU 120 according to exemplary embodiments may include, as the vehicle control components, at least one of an external ECU behavior acquisition module 710 for acquiring external ECU behavior information for the external ECU 120, a navigation management module 720 for performing a navigation function, and a nearby vehicle communication management unit 730 for communicating with an external ECU for vehicle control located near the vehicle 100.

One or more of the vehicle controller 700, the external ECU behavior acquisition module 710, the navigation management module 720, and the nearby vehicle communication management unit 730 may each be a hardware and/or software module included in the processor 610.

Also, one or more of the vehicle controller 700, the external ECU behavior acquisition module 710, the navigation management module 720, and the nearby vehicle communication management unit 730 may each be a program module (a code module) in an application (an application program) that is executed by the processor 610.

The vehicle control utilizing the above-described internal components of the external ECU will be described below in detail with reference to several drawings.

Figure 8:
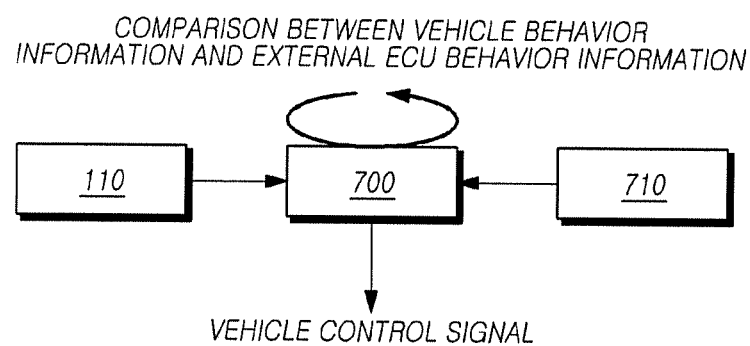
FIG. 8 is a diagram showing a method of enhancing vehicle control precision upon vehicle control of an external electronic control unit according to exemplary embodiments.

FIG. 8 is a diagram showing a method of enhancing vehicle control precision upon vehicle control of the external ECU 120 according to exemplary embodiments.

Referring to FIG. 8, as an example, the external ECU behavior acquisition module 710 may acquire external ECU behavior information including one or more of external ECU moving speed information, external ECU orientation information, external ECU acceleration information, and external ECU coordinate information through the GPS module 640 and/or the communication module 620.

Also, the external ECU behavior acquisition module 710 may acquire external ECU behavior information including one or more of a current external ECU location (a vehicle location) on a road, an external ECU traveling direction (a vehicular traveling direction), and the like, by using pre-stored electronic map data.

The vehicle controller 700 may compare the external ECU behavior information received from the external ECU behavior acquisition module 710 to the vehicle behavior information included in the vehicle information received from the communication module 620, correct a vehicle control signal generated based on the vehicle behavior information determined inside the vehicle 100 in real time, and transmit the corrected vehicle control signal to the vehicle communication system 110 through the communication module 620.

Alternatively, the vehicle controller 700 may generate a vehicle control signal on the basis of the external ECU behavior information received from the external ECU behavior acquisition module 710 and the vehicle behavior information included in the vehicle information received from the communication module 620 and may transmit the generated vehicle control signal to the vehicle communication system 110 through the communication module 620.

According to the above description, it is possible to correct control errors that may occur when the vehicle control is performed based on vehicle behavior information determined inside the vehicle 100 by using the external ECU behavior information, which is vehicle behavior information determined outside the vehicle 100. Thus, it is possible to significantly enhance vehicle control precision.

As an example, the external ECU behavior information may include at least one of external ECU location information (external ECU coordinate information), external ECU moving speed information, external ECU traveling direction information, external ECU orientation information, and external ECU acceleration information and may further include one or more of a current external ECU location (a vehicle location) on a road and an external ECU traveling direction (a vehicle direction).

Such external ECU behavior information may be terminal behavior information.

Figure 9:
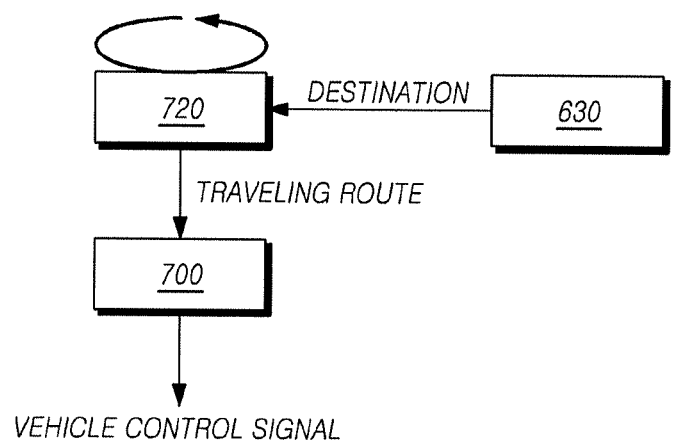
FIGS. 9 and 10 are diagrams showing a vehicle control method associated with a navigation function upon vehicle control of an external electronic control unit according to exemplary embodiments.
Figure 10:
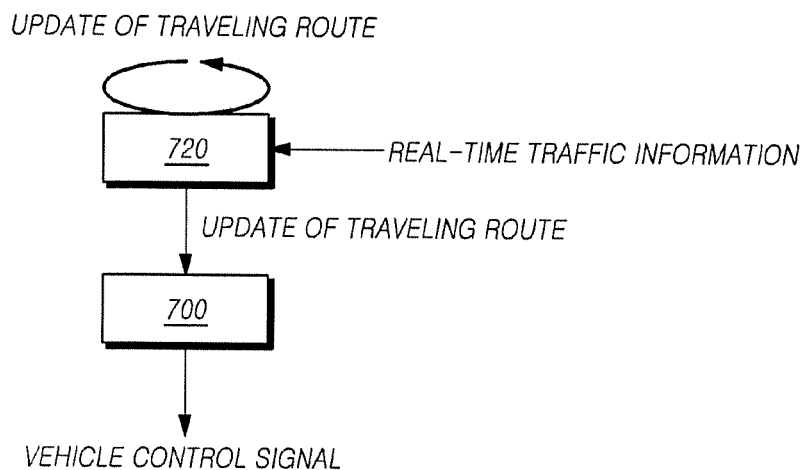

FIGS. 9 and 10 are diagrams showing a vehicle control method associated with a navigation function upon vehicle control of the external ECU 120 according to exemplary embodiments.

Referring to FIG. 9, when information regarding a destination is input through a navigation screen, the navigation management module 720 may calculate a traveling route from a current location to the destination.

The vehicle controller 700 may receive information regarding the traveling route from the navigation management module 720 and control traveling of the vehicle 100.

Here, the vehicular traveling control may refer to the control of at least one of steering, braking, suspension, and an engine of the vehicle 100 and also may refer to the control of an engine, an actuator, or the like for performing steering, braking, suspension, and the like of the vehicle 100 through a vehicle control signal.

That is, the vehicle controller 700 may transmit a vehicle control signal for enabling the vehicle 100 to travel along the traveling route to the vehicle communication system 110 through the communication module 620.

The vehicle control signal transmitted to the vehicle communication system 110 may be delivered to a corresponding actuator, the engine, or the like of the vehicle 100 and also may be delivered to an ECU for controlling the actuator, the engine, or the like of the vehicle 100.

Referring to FIG. 10, the navigation management module 720 may calculate (set) a traveling route according to real-time traffic information received through the GPS module 640 and/or the communication module 620.

When a traveling route is pre-calculated, the navigation management module 720 may update the pre-calculated traveling route according to the real-time traffic information received through the GPS module 640 and/or the communication module 620.

The vehicle controller 700 may transmit a vehicle control signal for enabling the vehicle 100 to travel along the traveling route updated by the navigation management module 720 to the vehicle communication system 110 through the communication module 620.

Figure 11:
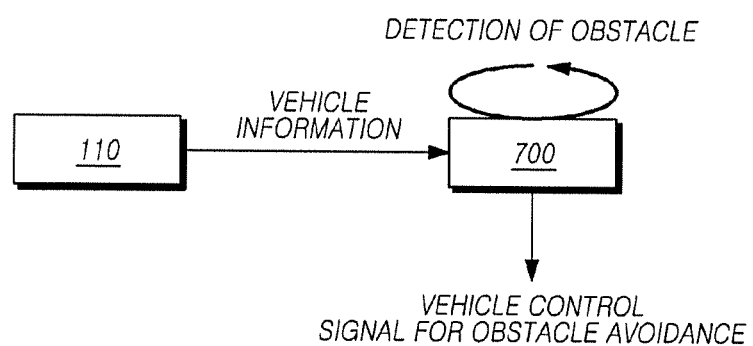
FIGS. 11 to 13 are diagrams showing a vehicle control method for avoiding obstacles in front of a vehicle upon vehicle control of an external electronic control unit according to exemplary embodiments.
Figure 12:
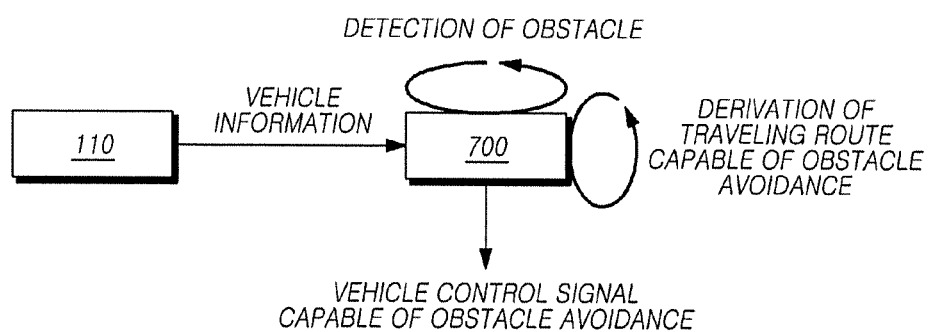
Figure 13:
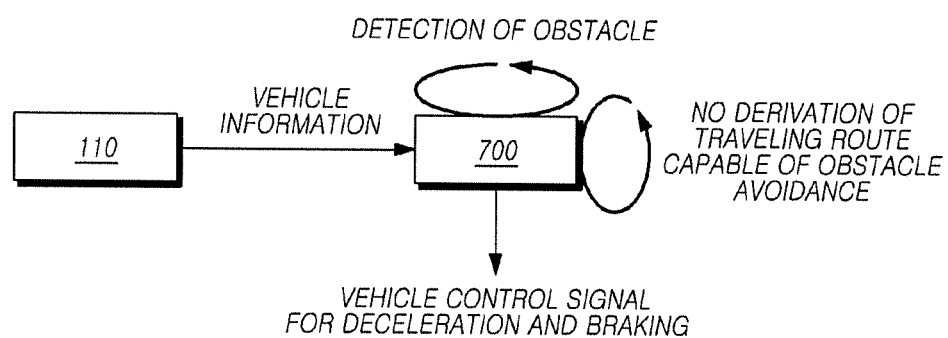

FIGS. 11 to 13 are diagrams showing a vehicle control method for avoiding obstacles in front of the vehicle 100 upon vehicle control of the external ECU 120 according to exemplary embodiments.

Referring to FIG. 11, the vehicle controller 700 may detect whether an obstacle such as a pedestrian and a vehicle is present near the vehicle 100 on the basis of the nearby-object detection information included in the vehicle information received through the communication module 620.

When an obstacle is detected near the vehicle 100 from the vehicle information, the vehicle controller 700 may transmit a vehicle control signal for avoiding the detected obstacle to the vehicle communication system 110 through the communication module 620.

Here, the vehicle controller 700 may generate and transmit a vehicle control signal including steering control information, braking control information, and the like so that the vehicle 100 can travel without colliding with obstacles (e.g., pedestrians, vehicles, etc.) in consideration of the location and behavioral state of the vehicle 100 and the locations and behavioral states of the obstacles.

An example of a vehicle control method associated with obstacle avoidance will be described below with reference to FIGS. 12 and 13. The vehicle controller 700 derives a traveling route capable of avoiding the detected obstacle on the basis of the maximum vehicle turn radius calculated based on the vehicle speed information checked by the vehicle speed sensor 210 and the maximum yaw rate information checked by the yaw rate sensor 230.

Referring to FIG. 12, when the traveling route capable of avoiding the detected obstacle is derived, the vehicle controller 700 may transmit a vehicle control signal for enabling the vehicle 100 to travel along the derived traveling route to the vehicle communication system 110 through the communication module 620.

Referring to FIG. 13, when the traveling route capable of avoiding the detected obstacle is not derived, the vehicle controller 700 may transmit a vehicle control signal including one or more of vehicle deceleration control information and braking control information to the vehicle communication system 110 through the communication module 620.

The vehicle control associated with the obstacle avoidance will be described with reference to FIGS. 14 and 15.

Figure 14:
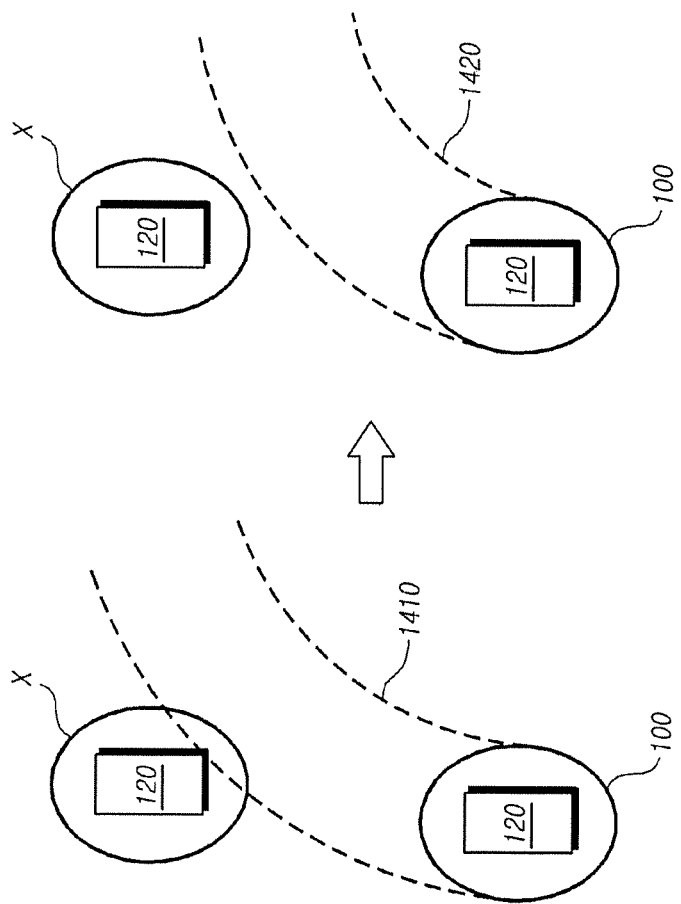
FIG. 14 is a diagram showing a situation in which a traveling route is changed according to vehicle control of an external electronic control unit according to exemplary embodiments.
Figure 15:
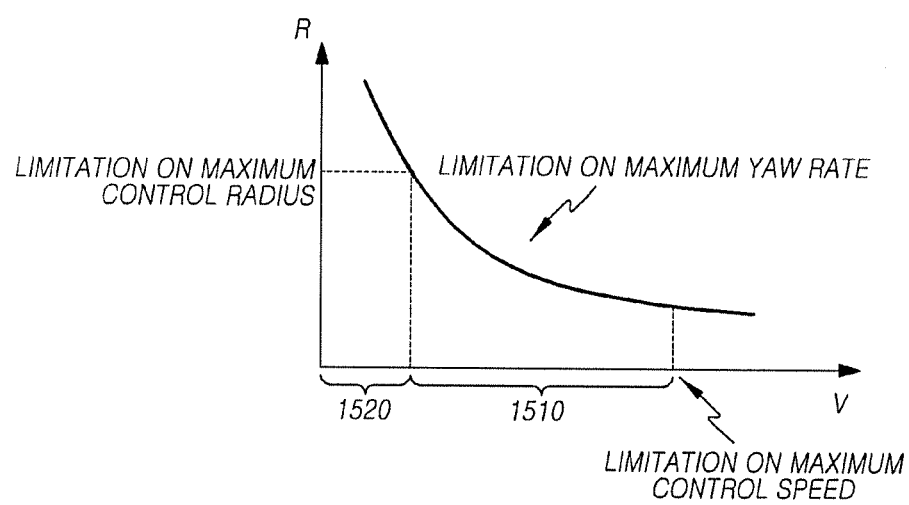
FIG. 15 is a graph of the maximum vehicle turn radius against vehicle speed considered upon vehicle control of an external electronic control unit according to exemplary embodiments.

FIG. 14 is a diagram showing a situation in which a traveling route is changed according to vehicle control of the external ECU 120 according to exemplary embodiments, and FIG. 15 is a graph of the maximum vehicle turn radius against vehicle speed considered upon vehicle control of the external ECU 120 according to exemplary embodiments.

Referring to FIG. 14, when a preceding vehicle X is detected as an obstacle while the vehicle 100 in which the external ECU 120 is installed (mounted) is traveling, the vehicle controller 700 of the external ECU 120 may derive a new traveling route 1420 capable of avoiding the obstacle X by changing a current traveling route 1410 of the vehicle 100 on the basis of the maximum vehicle turn radius calculated based on the vehicle speed information checked by the vehicle speed sensor 210 and the maximum yaw rate information checked by the yaw rate sensor 230.

As an example, the vehicle controller 700 of the external ECU 120 may calculate a vehicular traveling route on the basis of a predetermined radius range around the location of an external ECU 120 provided in the obstacle X found near the vehicle. For example, the predetermined radius may be set to an average length. However, this is merely an example, and thus the present invention is not limited thereto. Thus, the predetermined radius may be set differently as necessary. The vehicle controller 700 of the external ECU 120 may calculate a traveling route capable of avoiding the obstacle X in consideration of a predetermined radius range. The vehicle controller 700 of the external ECU 120 may generate a vehicle control signal according to the calculated traveling route.

When a new traveling route 1420 capable of avoiding the obstacle X can be derived, the vehicle controller 700 of the external ECU 120 may generate a vehicle control signal for controlling steering, braking, and the like of the vehicle 100 and provide the generated vehicle control signal to the vehicle communication system 110 so that the vehicle can travel along the new traveling route 1420.

Maximum yaw rate information Y may correspond to the product of vehicle speed information V and a maximum vehicle turn radius R. Accordingly, on the basis of the vehicle speed information V and the maximum yaw rate information Y, the maximum vehicle turn radius R may be calculated using Equation 1 below:

$$R \propto Y/V. \qquad \text{[Equation 1]}$$

The vehicle controller 700 determines whether the traveling route capable of avoiding the obstacle X can be derived in consideration of the maximum vehicle turn radius, the vehicle speed of the vehicle 100, and the location and speed of the obstacle X in front.

Referring to FIG. 15, when the derivation is not possible, primarily, when vehicle control is in a vehicle speed deceleration control range, the vehicle controller 700 performs vehicle control for decreasing the traveling speed of the vehicle 100.

Referring to FIG. 15, when obstacle avoidance is different even through the vehicle control being in the vehicle speed deceleration control range, the vehicle controller 700 performs vehicle control for stopping the traveling of the vehicle 100.

Figure 16:
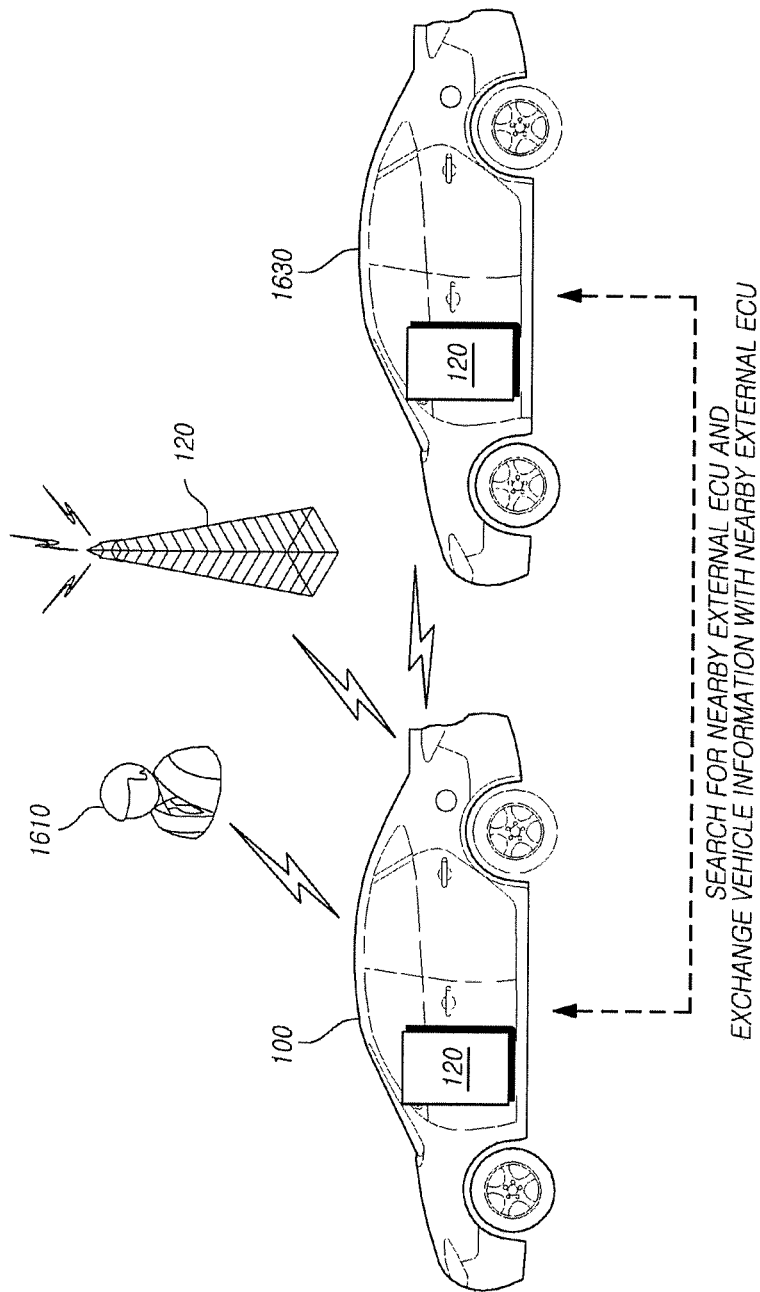
FIG. 16 is a diagram illustrating a vehicle control method performed through communication with a nearby external electronic control unit upon vehicle control of an external electronic control unit according to exemplary embodiments.

FIG. 16 is a diagram illustrating a vehicle control method performed through communication with a nearby external ECU 120 upon vehicle control of the external ECU 120 according to exemplary embodiments.

Referring to FIG. 16, the external ECU 120 according to exemplary embodiments may further include a nearby vehicle communication management unit 730 for searching for a nearby external ECU 120, communicating with the external ECU 120, and exchanging vehicle behavior information with the external ECU 120.

The nearby vehicle communication management unit 730 may search for the nearby external ECU 120 through one or more of a GPS communication scheme using a satellite 1610, a vehicle-to-vehicle (V2V) communication scheme through communication between the vehicle 100 and another vehicle 1630, and a vehicle-to-infrastructure (V2I) communication scheme through communication between the vehicle 100 and a nearby communication infrastructure 1620.

The external ECU 120 according to exemplary embodiments may communicate with the nearby external ECU 120 and exchange vehicle behavior information for each vehicle with the nearby external ECU 120.

Thus, the external ECU 120 may control the vehicle 100 in consideration of a state of the vehicle 1630 near the vehicle 100.

The above-described vehicle control method will be briefly described below.

Figure 17:
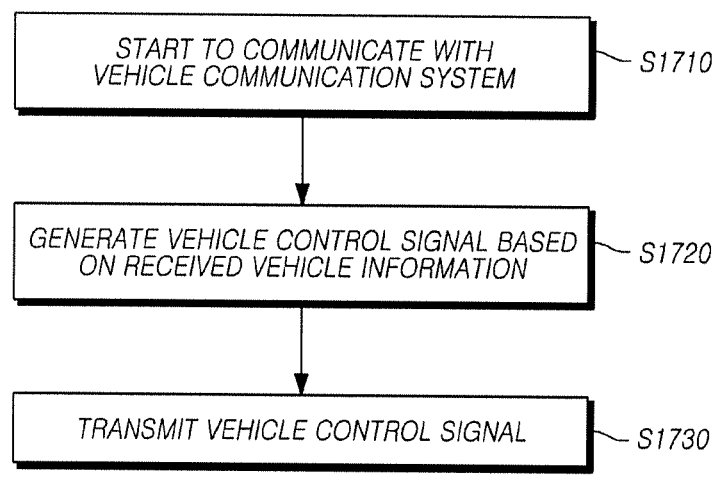
FIG. 17 is a flowchart showing a vehicle control method of an external electronic control unit according to exemplary embodiments.

FIG. 17 is a flowchart showing a vehicle control method of the external ECU 120 according to exemplary embodiments.

Referring to FIG. 17, the vehicle control method of the external ECU 120 may include performing control to start communication with the vehicle communication system 110 (S1710), generating a vehicle control signal for controlling the behavior of the vehicle 100 on the basis of vehicle information received through communication with the vehicle communication system 110, and performing control such that the vehicle control signal is transmitted through the communication module 620 (S1730), and the like.

All the functions for the above-described vehicle control according to exemplary embodiments may be programmed or made as an application (an application program).

Such an application may be stored and installed in the memory 650 of the external ECU 120 and executed by the processor 610 to perform all functions associated with the vehicle control.

According to exemplary embodiments, it is possible to provide a vehicle control system, an external electronic control unit, a vehicle control method, and an application which facilitate application of an additional vehicle control function or a vehicle control function update.

According to exemplary embodiments, it is also possible to provide a vehicle control system, an external electronic control unit, a vehicle control method, and an application which are capable of precise vehicle control.

According to exemplary embodiments, it is also possible to provide a vehicle control system, an external electronic control unit, a vehicle control method, and an application which are capable of autonomous vehicular traveling with a user's external ECU 120.

The external ECU 120 may be a mobile terminal such as a smart phone and a tablet or may be a hardware module or a software module included therein. An application capable of providing vehicle control and also providing autonomous traveling control service using the same may be installed in the external ECU 120.

The foregoing description and the accompanying drawings are exemplary only of the teachings of the present invention, and it will be apparent to those skilled in the art that various modifications and variations such as combination, separation, replacement, and changes of components can be made without departing from the essential characteristics of the present invention. Accordingly, the embodiments of the present invention are to be considered descriptive and not restrictive of the present invention, and do not limit the scope of the present invention. The scope of the invention should be construed by the appended claims, and all technical spirits within the scope of their equivalents should be construed as included in the scope of the invention.

What is claimed is:

1. A vehicle control system comprising:
    an image sensor mounted to a vehicle so as to have a field of view exterior of the vehicle, the image sensor configured to capture image data;
    a first processor disposed in the vehicle apart from the image sensor and configured to process at least one image data captured by the image sensor;
    at least one sensor disposed in the vehicle and configured to detect vehicle behavior information of the vehicle;
    a second processor disposed in the vehicle apart from the at least one sensor and configured to process the vehicle behavior information detected by the at least one sensor;
    one or more actuators disposed in the vehicle to execute behavior of the vehicle; and
    a vehicle communication system disposed in the vehicle and configured to communicate with the first processor and the second processor, wherein the vehicle communication system is configured to:
        transmit vehicle information acquired from the first processor and the second processor to an electronic control unit (ECU), which is a portable user terminal carriable by a user,
        receive a vehicle control signal for controlling the behavior of the vehicle from the ECU, and
        output the vehicle control signal such that the one or more actuators are executed by the vehicle control signal, and
    wherein the vehicle control signal received from the ECU includes a control signal corrected by comparing the transmitted vehicle information with ECU behavior information acquired by using prestored electronic map data by the ECU, and
    wherein the ECU behavior information, which is vehicle behavior information determined by the ECU, includes at least one of location information of the ECU, moving speed information of the ECU, traveling direction information of the ECU, orientation information of the ECU, or acceleration information of the ECU.

2. The vehicle control system of claim 1, wherein the vehicle control signal received from the ECU by the vehicle communication system includes one or more of a steering control signal, a braking control signal, a suspension control signal, and an engine control signal for the vehicle.

3. The vehicle control system of claim 1, wherein the vehicle control signal received from the ECU by the vehicle communication system further includes a traveling control signal for enabling the vehicle to travel along a predetermined traveling route or an obstacle avoidance signal for enabling the vehicle to avoid an obstacle.

4. The vehicle control system of claim 1, wherein the vehicle information transmitted to the ECU by the vehicle control system includes one or more of the vehicle behavior information of the vehicle, and
    wherein the vehicle information further includes nearby-object detection information of an object near the vehicle.

5. The vehicle control system of claim 4, wherein the vehicle behavior information includes one or more of vehicle speed information, acceleration information, yaw rate information, steering angle information, direction angle change information, and road inclination information, and
    wherein the nearby-object detection information includes one or more of radar-detected information, camera-detected information, laser-detected information, and ultrasonic detection information.

6. The vehicle control system of claim 1, wherein the vehicle communication system wirelessly transmits or receives information to or from the ECU.

7. The vehicle control system of claim 1, wherein the vehicle communication system communicates with the at least one sensor through at least one of Controller Area Network (CAN), Local Interconnect Network (LIN), FlexRay, or Ethernet.

8. A vehicle control system comprising:
    an image sensor mounted to a vehicle so as to have a field of view exterior of the vehicle, the image sensor configured to capture image data;
    at least one sensor capable of being disposed in the vehicle and configured to detect vehicle behavior information of the vehicle; and
    a domain control unit disposed in the vehicle apart from the image sensor and the at least one sensor and configured to process the image data captured by the image sensor, process the vehicle behavior information detected by the at least one sensor, and control at least one of a steering device, a braking device, a suspension device, or an engine device of the vehicle,
    wherein the domain control unit processes information detected by the image sensor and the at least one sensor to acquire vehicle information including the vehicle behavior information, transmits the acquired vehicle information to an electronic control unit (ECU), which is a portable user terminal carriable by a user, receives a vehicle control signal for controlling behavior of the vehicle from the ECU, and outputs the vehicle control signal to operate at least one of the steering device, the braking device, the suspension device, or the engine device of the vehicle according to the vehicle control signal, and wherein the vehicle control signal received from the ECU includes a control signal corrected by comparing the transmitted vehicle information with ECU behavior information acquired by using prestored electronic map data by the ECU, and wherein the ECU behavior information, which is vehicle behavior information determined by the ECU, includes at least one of location information of the ECU, moving speed information of the ECU, traveling direction information of the ECU, orientation information of the ECU, or acceleration information of the ECU.

9. The vehicle control system of claim 8, wherein the vehicle control signal received from the ECU by the domain control unit further includes a traveling control signal for enabling the vehicle to travel along a predetermined traveling route or an obstacle avoidance signal for enabling the vehicle to avoid an obstacle.

10. A vehicle having a vehicle control system, wherein the vehicle control system comprises:
an image sensor disposed in the vehicle to have visibility to an outside of the vehicle and configured to capture image data;
an image processor disposed in the vehicle apart from the image sensor and configured to process the image data;
one or more actuators capable of being disposed in the vehicle to execute behavior of the vehicle; and
a vehicle communication system configured to transmit the image data processed by the image processor to an electronic control unit (ECU), which is a portable user terminal carriable by a user, to receive a vehicle control signal generated by the ECU for controlling the behavior of the vehicle, and to output the vehicle control signal to the one or more actuators,
wherein the vehicle control signal received from the ECU includes a control signal corrected by comparing vehicle behavior information with ECU behavior information acquired by using prestored electronic map data by the ECU, and
wherein the ECU behavior information, which is vehicle behavior information determined by the ECU, includes at least one of location information of the ECU, moving speed information of the ECU, traveling direction information of the ECU, orientation information of the ECU, or acceleration information of the ECU.

11. The vehicle of claim 10, wherein the vehicle control signal further includes a traveling control signal for enabling the vehicle to travel along a predetermined traveling route or an obstacle avoidance signal for enabling the vehicle to avoid an obstacle.

12. An electronic control unit (ECU) comprising a processor, which is a portable user terminal carriable by a user, configured to:
communicate with a vehicle communication system of a vehicle,
transmit a vehicle control signal for controlling behavior of the vehicle to the vehicle communication system based on vehicle information received from the vehicle communication system,
acquire ECU behavior information by using prestored electronic map data,
correct the vehicle control signal by comparing the ECU behavior information with vehicle behavior information included in the received vehicle information, and
transmit the corrected vehicle control signal to the vehicle communication system,
wherein the ECU behavior information, which is vehicle behavior information determined by the ECU, includes at least one of location information of the ECU, moving speed information of the ECU, traveling direction information of the ECU, orientation information of the ECU, or acceleration information of the ECU.

13. The ECU of claim 12, wherein the processor is further configured to:
calculate a traveling route from a current location to a destination when information regarding the destination is input, and
transmit a vehicle control signal for enabling the vehicle to travel along the traveling route, to the vehicle communication system.

14. The ECU of claim 12, the processor updates a traveling route according to real-time traffic information and transmits a vehicle control signal for enabling the vehicle to travel along the traveling route, to the vehicle communication system.

15. The ECU of claim 12, wherein, when an obstacle is detected near the vehicle by using the vehicle information, the processor transmits a vehicle control signal for enabling the vehicle to avoid the obstacle, to the vehicle communication system.

16. The ECU of claim 12, wherein, based on a maximum vehicle turn radius calculated based on vehicle speed information and maximum yaw rate information, the processor derives a traveling route capable of avoiding an obstacle and transmits a vehicle control signal for enabling the vehicle to travel along the derived traveling route, to the vehicle communication system.

17. The ECU of claim 12, wherein, based on a maximum vehicle turn radius calculated based on vehicle speed information and maximum yaw rate information, when a traveling route capable of avoiding an obstacle is not derived, the processor transmits one or more of vehicle deceleration control information and braking control information, to the vehicle communication system.

18. The ECU of claim 12, wherein the processor is further configured to:
search for a nearby ECU corresponding to a nearby vehicle,
exchange vehicle behavior information in communication with the nearby ECU,
calculate a traveling route of the vehicle to be outside a predetermined radius range of the nearby vehicle based on a location of the nearby ECU to avoid collision with the nearby vehicle, and
generate a vehicle control signal which navigates the vehicle along the calculated traveling route.

19. A non-transitory tangible computer readable medium having stored thereon software instructions that, when executed by a processor, which is a portable user terminal carriable by a user, cause the processor to perform:
starting communication with a vehicle communication system disposed in the vehicle;
generating a vehicle control signal for controlling behavior of the vehicle based on vehicle information received from the vehicle communication system; and
performing control to transmit the vehicle control signal to the vehicle communication system, wherein the vehicle control signal transmitted to the vehicle communication system is corrected by comparing the received vehicle information with computer readable medium behavior information acquired by using prestored electronic map data, and wherein the computer readable medium behavior information, which is vehicle behavior information determined by the processor, includes at least one of location information of the portable user terminal, moving speed information of the portable user terminal, traveling direction information of the portable user terminal, orientation information of the portable user terminal, or acceleration information of the portable user terminal.

20. An application stored in a recording medium for executing a method performed by an external electronic control unit (ECU), which is a portable user terminal carriable by a user, the method comprising:

performing, by a processor included in the ECU, control to start communication with a vehicle communication system disposed in the vehicle;

starting, by the processor, communication with the vehicle communication system;

generating, by the processor, a vehicle control signal for controlling behavior of the vehicle based on vehicle information received from the vehicle communication system; and performing, by the processor, control to transmit the vehicle control signal to the vehicle communication system, wherein the vehicle control signal transmitted to the vehicle communication system is corrected by comparing the received vehicle information with ECU behavior information acquired by using prestored electronic map data by the ECU, and wherein the ECU behavior information, which is vehicle behavior information determined by the ECU, includes at least one of location information of the ECU, moving speed information of the ECU, traveling direction information of the ECU, orientation information of the ECU, or acceleration information of the ECU.

* * * * *